United States Patent
Nowacki et al.

(12)

(10) Patent No.: US 6,196,020 B1
(45) Date of Patent: Mar. 6, 2001

(54) MOTOR, REFRIGERATION MACHINE OR HEAT PUMP

(76) Inventors: Jan-Erik Nowacki, Södra Kungsvägen 269, S-181 63, Lidingö ; Eric Granryd, Slätthällsvägen 2, S-183 64, Täby, both of (SE)

( * ) Notice: Subject to any disclaimer, the term of this patent is extended or adjusted under 35 U.S.C. 154(b) by 0 days.

(21) Appl. No.: 09/341,358
(22) PCT Filed: Jan. 14, 1998
(86) PCT No.: PCT/SE98/00052
§ 371 Date: Jul. 9, 1999
§ 102(e) Date: Jul. 9, 1999
(87) PCT Pub. No.: WO98/30846
PCT Pub. Date: Jul. 16, 1998

(30) Foreign Application Priority Data

Jan. 14, 1997 (SE) .................................. 9700079

(51) Int. Cl.[7] ................................................ F25B 3/00
(52) U.S. Cl. ................................ 62/499; 62/86; 62/402
(58) Field of Search ........................... 62/86, 402, 499; 165/86

(56) References Cited

U.S. PATENT DOCUMENTS

| 2,451,873 | 10/1948 | Roebuck . | |
|---|---|---|---|
| 2,490,064 | 12/1949 | Kollsman . | |
| 3,424,234 | * 1/1969 | Laing | 62/499 |
| 3,828,573 | 8/1974 | Eskeli . | |
| 3,948,061 | * 4/1976 | Kidwell | 62/499 |
| 4,117,695 | * 10/1978 | Hargreaves | 62/499 |
| 5,168,726 | * 12/1992 | York | 62/499 |
| 5,295,370 | * 3/1994 | Morris | 62/499 |

FOREIGN PATENT DOCUMENTS 1420722   1/1976   (GB) .

* cited by examiner

Primary Examiner—Ronald Capossela
(74) Attorney, Agent, or Firm—Frishauf, Holtz, Goodman, Langer & Chick, P.C.

(57) ABSTRACT

When not only integrating the compressor and expander, but also the heat exchanger in one single rotor, a machine working according to the gas turbine process can be simplified. The gas turbine process in such a machine can also be run in reversed mode as a refrigeration machine or heat pump. Lower relative velocities between the working fluid and the components of the machine can be used which should lead to lower frictional losses and a higher efficiency. In order to further reduce the friction the rotor should rotate in a chamber with low pressure or in a medium with lower friction than air. The medium that exchanges heat with the working medium here called the heat carrying fluid is also taken into the rotor.

8 Claims, 2 Drawing Sheets

MOTOR, REFRIGERATION MACHINE OR HEAT PUMP

BACKGROUND OF THE INVENTION

A machine according to this invention works as a motor according to the gas turbine cycle (the Joule/Brayton cycle) or as a refrigeration machine or heat pump according to the reversed gas turbine cycle. The invention thus includes a machine that can run either as a motor when the produced shaft power is utilised, a refrigeration machine when the produced cooling power is used or as a heat pump when the heating power is utilised. In both the motor case and the refrigeration/heat pump case a working medium is being compressed, heat is being added or subtracted, and the working medium is thereafter expanded. If heat is being added to the compressed working medium in the heat exchanger, the machine according to the invention will become a motor. If heat on the other hand is subtracted, the machine according to the invention will become a refrigeration machine or a heat pump. The main components, the compressor, the heat exchanger and the expander are according to the invention joined into one single rotating part, hereinafter called the rotor. Two media are flowing through the rotor, namely, the working medium that is compressible and the heat carrying fluid. When the machine is used as a motor, hot oil could be used as a heat carrying fluid and for instance air as working medium. Alternatively an exothermal reaction for instance combustion in the working medium itself can be used as a heat carrying fluid. When the machine is used as a refrigeration machine/heat pump air can be used as a working medium and for instance water as heat carrying fluid.

In another form of the machine, when the working medium is not atmospheric air, an additional heat exchanger is needed to another fluid called the cold carrying fluid. In the motor case, the cold carrying fluid is absorbing heat while in the refrigeration or heat pump case, it is delivering heat to the working medium.

In a third form of the machine as a motor, the mechanical energy output is delivered fully or partly from an external expander. If the machine in this form is run as a heat pump or refrigeration machine, the rotor rotation and the propulsion of the working medium are accomplished fully or partly with an external compressor.

The gas turbine cycle is normally accomplished by first compressing the working medium (normally air) in a separate compressor after which it is heated in a separate combustion chamber and finally is expanded in a separate turbine. In all three components the velocity relative to the walls, guidevanes and blades are high which results in frictional losses.

Heat pumps similar to the invention are shown in the Swedish patents 122418 and 163924. According to the first patent, the heat carrying fluid is led outside the rotating heat exchanger whereby the velocity difference between the heat carrying fluid and the heat exchanger surface becomes large and the frictional losses between the heat carrying fluid and the heat exchanging surface becomes large. In the second patent an attempt to reduce the velocity difference between the rotating heat exchanger and the heat carrying fluid has been made, by introducing a secondary separating wall, so that the velocity difference is divided into two parts. This method will not likely result in an especially large reduction of the frictional losses.

A similar idea is also described in GB 1443802A. In this invention the heat exchange is integrated with the compressor, and the expander is placed on a separate shaft so that the expander is not rotating with the same angular velocity as the compressor. FR2699653A1 describes another similar idea where the compression among other things is accomplished with an axial compressor. In DE2729134-A, a machine is described where among other things the heat is transferred by radiation from the heat carrying fluid which runs outside the machine and where the cold carrying fluid runs centrally in the machine. The patent GB2128310 shows an advanced magnetic construction where the heat carrying fluid runs in the surround stator body and the cold carrying fluid runs through the shaft. In U.S. Pat. Nos. 2,490,064 and 2,451,873 solutions are shown where the heat exchange takes place during the compression phase and not as in our invention at substantially constant pressure. The U.S. Pat. No. 2,490,064 and GB-1420722 differ from our invention as the heat carrying fluid is not rotating inside the rotor.

OBJECT OF THE INVENTION

One goal with the suggested machine is to minimise the losses during compression, heat exchange and expansion by reducing the relative velocity of the working medium to the different parts of the machine compared to the normal process with a separate compressor, heat exchanger and expander. That should lead to lower losses and an increased efficiency. Another goal is to let both the working medium and the heat carrying fluid run through channels in the rotor. The relative velocity between the two media can then be regulated to a value required by the heat exchange and no more. In order to reduce the frictional losses of the rotor it must rotate surrounded by low pressure or a special medium resulting in low friction.

BRIEF DESCRIPTION OF THE DRAWINGS

In the following text the invention is described with reference to the following figures in which.

DETAILED DESCRIPTION

Figure 1:
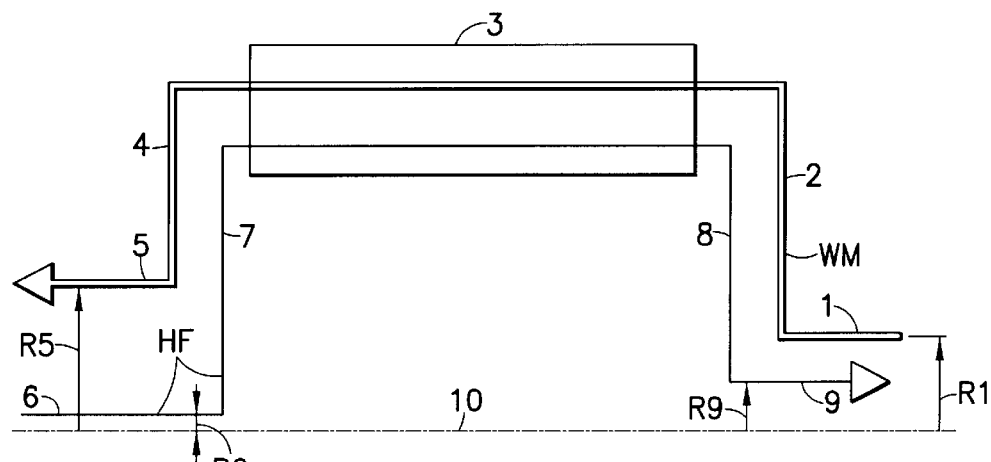
FIG. 1 schematically shows the path of the working medium and the heat carrying fluid through the rotor.

In FIG. 1 it is shown how the working medium (WM) with centers at point 1, is compressed as the compressor blades 2 forces the medium to rotate whereby the centrifugal force increases the pressure and temperature. Thereafter the working medium absorbs or delivers heat in the heat exchanger 3. Finally the working medium is expanded in the passage through the expander blades 4 whereby pressure and temperature falls. The working medium leaves the machine through the outlet 5. The heat carrying fluid (HF) enters the machine at point 6, is pumped radially with the pump 7 after which the heat carrying fluid delivers or absorbs heat in the heat exchanger 3. Finally the heat carrying fluid passes the turbine 8 and out through he exit 9. The rotational axis is only indicated with a line in FIG. 1.

Figure 2:
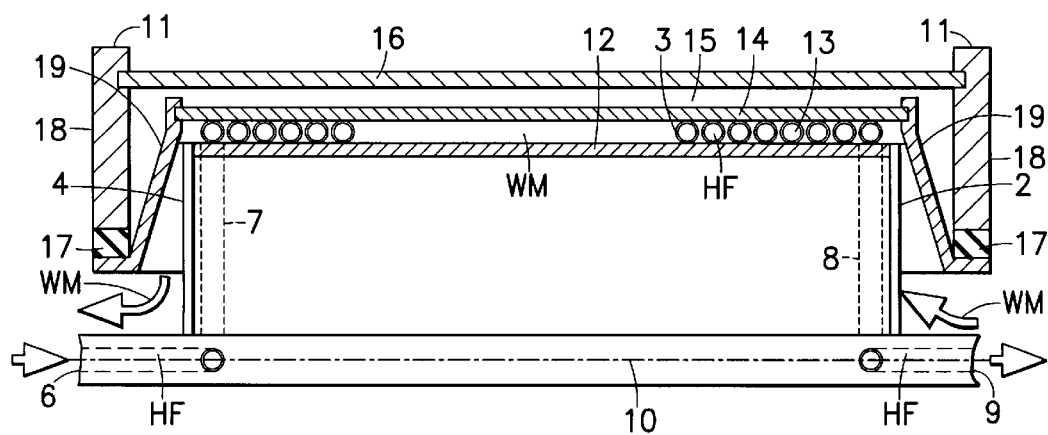
FIG. 2 shows an example of the path of the working medium and the heat carrying fluid through a real rotor, FIG. 3 schematically shows the path of the working medium using an external compressor in an open loop

In FIG. 2 the way of the paths of the working medium (WM) and the heat carrying fluid (HF) are shown through a real rotor. The blades of the compressor 2 and of the expander 4 are shown more in detail here. The path of the working fluid through the compressor and expander is limited by through the rotors outer end plates 18 and inner end plates 19. In this example, the heat exchanger 3 is formed as a chamber limited by an inner rotor cylinder 12 and an outer rotor cylinder 14 in which a spiral shaped pipe with outer flanges 13 is placed. The heat carrying fluid enters through the shaft 10 via the inlet 6, is then brought to the heat exchanger through the indicated pump channel 7, runs through the flanged heat exchanger pipe 13 to finally exit through the turbine channel 8 and out through the heat carrying fluid outlet 9 in the shaft 10. It could also be anticipated that the heat exchanger is an integral part of the inner rotor cylinder 12. The outer surface of the inner rotor cylinder 12, is then wholly or partly joined with the shaft 10 utilising radially heat conducting material whereby the heat carrying fluid is led through the shaft and heat is radially conducted.

As shown in FIG. 1, the entrance radius R1 of the working medium (WM) at 1 can be made smaller than the exit radium R5 at 5. A driving force for the flow of the working medium is then automatically achieved. The inlet radius R6 of the heat carrying fluid (HF) 6 can be made smaller than the exit radius R9 in the heat carrier exit at 9. A driving force for the flow of the heat carrying fluid is then automatically achieved. The rotor rotates in a stator chamber 15, that is limited by an outer stator cylinder 16 two stator end plates 11 and two seals 17 to the rotor. The stator chamber 15 is preferably connected to a vacuum pump or filled with a medium resulting in low frictional losses.

Figure 3:
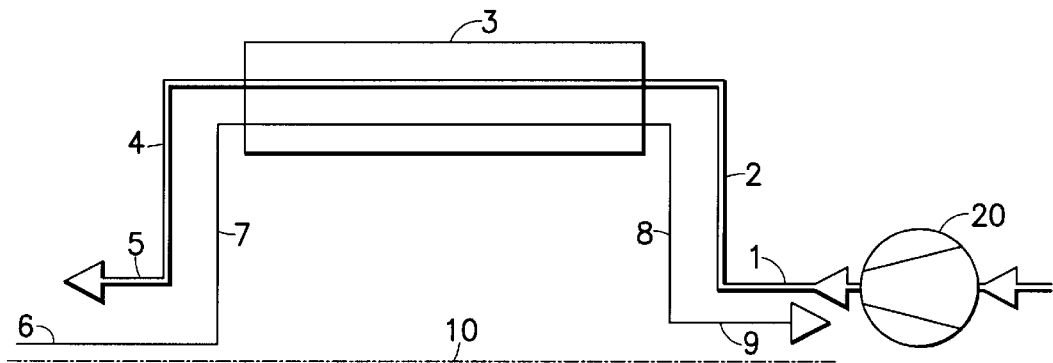

In FIG. 3 it is shown how an external compressor 20, in an open process can set the rotor into rotation whereby the radius for the working fluid in the inlet 1 can be made just as large as the radius in the outlet 5.

Figure 4:
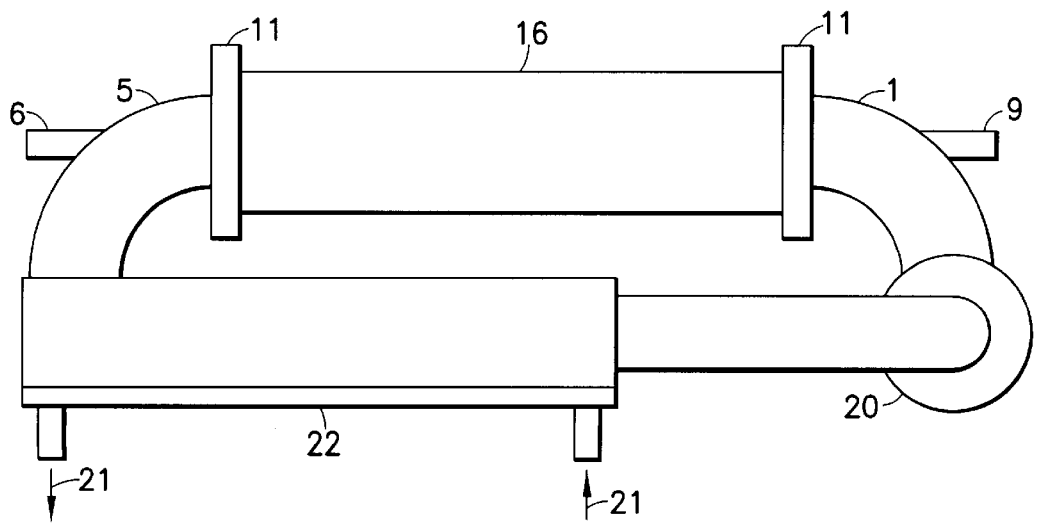
FIG. 4 shows use of an external compressor in a closed loop.

FIG. 4 shows in the refrigeration machine/heat pump case how the working medium is driven into the rotor inlet 1 by an external compressor 20. From the rotor outlet 5 the working medium is then led to a heat exchanger 22 which in the refrigeration/heat pump case is heated by a cold carrying fluid. The heat carrying fluid enters through the shaft at 6 and exits at 9 in this case.

What is claimed is:

1. A rotary machine that can be used as at least one of a motor, a refrigeration machine, and a heat pump, said rotary machine comprising:

a rotor through which both a working medium and a heat carrying fluid are directed during mutual heat exchange, said rotor comprising a compressor, a heat exchanger and an expander;

means for directing the working medium through the heat exchanger in a first direction; and means for directing the heat carrying fluid through the heat exchanger in a second direction opposite to said first direction;

wherein the working medium is first directed radially outwards through the compressor, then axially through the heat exchanger, and finally radially inwards through the expander; and wherein the mutual heat exchange between the working medium and the heat carrying fluid is substantially carried out under constant pressure in the heat exchanger, where the working medium and the heat carrying fluid are directed in counter current flow.

2. The rotary machine according to claim 1, wherein said means for directing the working medium through the heat exchanger in the first direction at least partly comprises forming an outer radius at an inlet to the compressor to be smaller than an outer radius at an outlet of the expander, so that a pressure is induced which causes the working medium to flow through the heat exchanger in the first direction.

3. The rotary machine according to claim 2, wherein said means for directing the heat exchanger fluid through the heat exchanger in the second direction at least partly comprises forming an outer radius at an inlet for the heat carrying fluid to be smaller than an outer radius at an outlet for the heat carrying fluid, so that a pressure is induced which causes the heat carrying fluid to flow through the heat exchanger in the second direction.

4. The rotary machine according to claim 1, wherein said means for directing the heat carrying fluid through the heat exchanger in the second direction at least partly comprises forming an outer radius at an inlet for the heat carrying fluid to be smaller than an outer radius at an outlet for the heat carrying fluid, so that a pressure is induced which causes the heat carrying fluid to flow through the heat exchanger in the second direction.

5. The rotary machine according to any one of claims 1–4, wherein:

the rotor includes a rotor cylinder; and the rotary machine further comprises a stator chamber arranged outside the rotor cylinder, said stator chamber being at least one of put under low pressure and filled with a medium giving lower frictional losses than air.

6. The rotary machine according to any one of claims 1–4, wherein said means for directing the working medium through the heat exchanger in the first direction at least partly comprises an external compressor.

7. The rotary machine according to any one of claims 1–4, wherein the working medium flows through the rotary machine in a closed loop.

8. The rotary machine according to any one of claims 1–4, further comprising an external heat exchanger, and wherein the working medium exchanges heat with a cold carrying fluid in the external heat exchanger.

* * * * *